H. P. KRAFT.
TIRE GAGE.
APPLICATION FILED JUNE 15, 1917.

1,366,469. Patented Jan. 25, 1921.

WITNESSES:
René Bruine
Harry M. Brand

INVENTOR:
Henry P. Kraft,
By Attorneys,
Fraser, Burk & Myers

UNITED STATES PATENT OFFICE.

HENRY P. KRAFT, OF RIDGEWOOD, NEW JERSEY.

TIRE-GAGE.

1,366,469.  Specification of Letters Patent.  Patented Jan. 25, 1921.

Application filed June 15, 1917. Serial No. 174,864.

*To all whom it may concern:*

Be it known that I, HENRY P. KRAFT, a citizen of the United States of America, residing in Ridgewood, in the county of Bergen and State of New Jersey, have invented certain new and useful Improvements in Tire-Gages, of which the following is a specification.

This invention relates to improvements in pressure gages and is particularly directed to gages which are used for the inflating of pneumatic tires or the like.

It is customary in ascertaining the pressures in pneumatic tires to apply a gage directly to the nipple of the tire valve, the gage having a depressing foot which unseats the check valve and permits air to flow into the interior of the gage. It has heretofore been proposed to introduce the gage into the pipe-line which leads air to the tire valve, but such attempts have not proven satisfactory, since in most cases the gage is affected unfavorably by the pump.

The present invention provides a construction whereby the gage may be applied to the air pipe leading from the pump or reservoir, or to the pump connection or junction of the air line with the tire valve, and which obviates the disadvantages heretofore encountered.

Figure 1 of the accompanying drawings is a side elevation showing the gage applied to the air pipe or hose;

Figure 5:
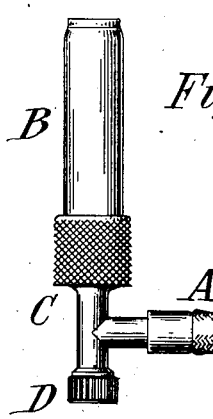
Fig. 5 is an elevation showing the gage as applied to a pump connection.

In the drawings, A indicates the air pipe or hose through which the compressed air is conducted to inflate the tire; B is the gage as a whole; C is a connecting member for attaching the gage to the air line; D, in Fig. 5, is a pump connection adapted to be coupled to the valve of a pneumatic tire.

Figure 3:
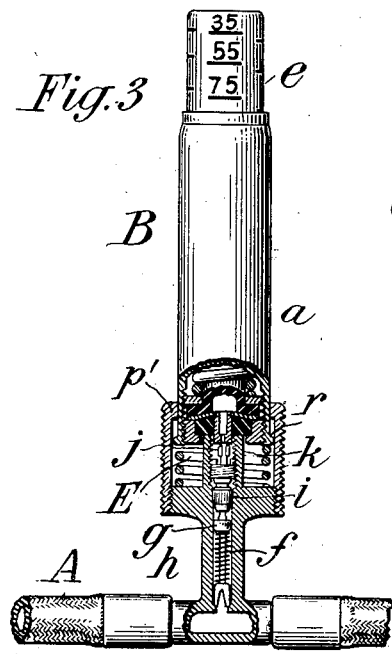
Fig. 3 is a similar view showing the gage in use.
Figure 4:
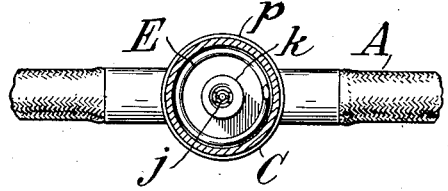
Fig. 4 is a horizontal section on the line 4—4 in Fig. 2.

The form of gage B shown is that which is now well known on the market under the name "Schrader universal tire pressure gage." It comprises an outer cylindrical casing $a$ having at its lower end a valve unseating projection or so-called "deflating foot" adapted to be pressed against a tire valve so as to open such valve and admit pressure through a central opening $b$ into the interior of a yielding expansible chamber $c$ (being a soft rubber tubular diaphragm closed at its top and clamped at its bottom to form an air-tight joint) surrounded by a spring $d$ which resists the expansion or elongation of the chamber under pressure, and which constitutes the fluid pressure weighing member of the gage; and a movable indicating member $e$ which is constructed as a telescopic sleeve or cap which is lifted by the elongation of the chamber $c$ and carries figures which are exposed above the top of the casing $a$ to indicate pressure, as shown in Fig. 3. The indicating sleeve $e$, when lifted, remains in place by being held frictionally until manually restored. It thus records the internal pressure, so that this may be read at leisure.

Gages of this construction or of any analogous mode of operation are not adapted for connection in the pump hose because the pressures in pumping up a tire are intermittent or fluctuating, and the pressure in the hose is higher during pumping than that in the tire; and as the gage records the highest pressure, this indication would be deceptive as to the pressure actually existing in the tire.

According to the present invention the gage is normally cut off from communication with the air pipe or hose, so that it is not affected by the pressure during the pumping up or inflating operation; instead it is so connected that it may be put into communication with the hose at any time at the will of the operator, so that he may at any moment stop pumping and take a gage reading of the pressure. To this end the gage is movably connected to the inflating hose, so that it may be moved or displaced by the operator whenever he may wish to take a reading; such a displacement establishes communication between the interior of the hose and the interior of the gage, so that the gage becomes operative, and after it has responded to the pressure thus admitted to it, it may be returned to its normal position. If the indicated pressure is not high enough the pumping may be resumed without even taking the trouble to press down the indicating sleeve.

To attain this object the connecting member C is made with a tubular communication with the hose or pump connection, being a branch passage or duct *f* in which is introduced a check valve *g* normally seated by a spring *h*, so that in the normal condition this valve is closed and all air pressure is cut off from the gage. For convenience, the check valve is constructed as the ordinary Schrader tire valve, the connecting member C being bored out and screwthreaded precisely like the interior of the shell of a tire valve, and being fitted with the usual screw plug or seat member *i* of such tire valve, all so arranged that when the tire valve is introduced in its place the upper end of its stem or pin *j* shall, when the valve is seated, stand at the conventional height with reference to the top of the upwardly projecting threaded nipple *k* (which answers to the threaded upper end of the usual tire valve). The stem is shown in this position in Fig. 2.

Figure 1:
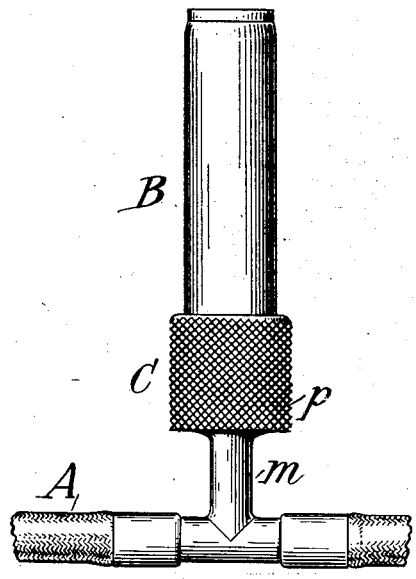
Figure 2:
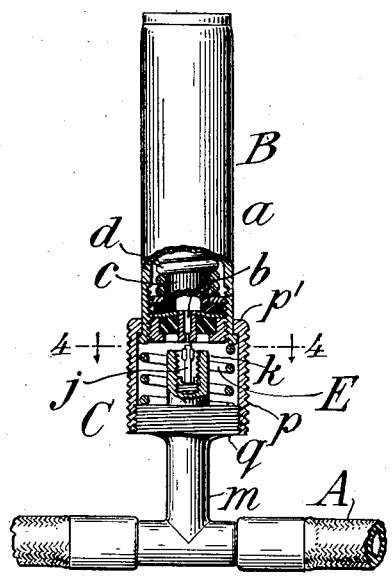
Fig. 2 is a similar view, partly in section, showing the internal construction.

The connecting member C is shown as including not only the tubular portion *m* inclosing the valve just described, but also a larger tubular portion *p* which incloses the lower end or foot of the gage B. This portion *p* is separable from the neck portion *m*, being preferably screwed upon a flange *q* formed on the neck *m* and having external threads. The tubular portion *p* has an inturned flange *p'* at its upper end, which embraces the outer face of the gage casing *a*. The gage is kept from escaping by having at its foot an outer flange *r* which in its normal position abuts against the flange *p'*, as shown in Fig. 2. An internal spring E is inclosed within the member C and, reacting upon flange *q*, presses upwardly against the gage B so as to normally hold the gage in its inoperative position, as shown in Fig. 2.

When the operator wishes to take a pressure reading he has only to grasp the gage B and push it down bodily in the manner shown in Fig. 3. Thereupon the deflating foot of the gage presses down the valve stem *j* and opens the check valve so as to admit air pressure to pass up into the gage to lift its indicating member *e*, as shown. At this time leakage of air into the spring chamber within the tubular member or shell *p* is prevented by the usual soft packing or gasket at the foot of the gage making a close joint with the top of the tubular portion *k*, as shown in Fig. 3. On releasing the manual pressure upon the gage, the spring lifts it again to its normal position, whereupon the check valve closes. Thereupon the air admitted to the gage escapes therefrom through its central opening *b* into the spring chamber and thence outward to any suitable leak orifice, as around the unpacked joint between the gage and the inturned flange *p'*.

The invention provides a very handy and convenient construction whereby the gage is kept in proper relation with the pump or inflating hose ready for instant use when desired, and without danger of becoming lost.

It will be manifest that the details of construction may be varied according to the particular type of gage which is employed (any other known or suitable gage being useful in place of the Schrader gage shown). The details of construction may be greatly varied without departing from the invention.

I claim as my invention:—

1. The combination with an air conduit for inflating a tire of a pressure gage of the telescopic type and an intervening connection, the gage bodily removable therefrom, a spring closed check valve in such connection which is normally closed to exclude conduit pressure from the gage, and manually operated means operable while the gage is held by said connection, and independently thereof for opening such check valve to admit pressure to the gage.

2. The combination with an air conduit for inflating a tire of a pressure gage and an intervening connection, a check valve in such connection which is independent of the gage and is normally closed to exclude conduit pressure from the gage, the gage movable bodily in and independently of such connection and adapted when displaced to open such check valve to admit pressure from the conduit to the gage.

3. The combination with an air conduit for inflating a tire of a pressure gage and an intervening connection, a check valve in such connection which is independent of the gage and is normally closed to exclude conduit pressure from the gage, said gage and connection adapted to permit a bodily telescopic movement of the gage independent of any movement of the connection and the gage adapted on such movement to open such check valve to admit pressure from the conduit to the gage.

4. The combination with an air conduit for inflating a tire of a pressure gage having at its foot a packing and a valve unseating means, and an intervening connection, the latter having a passage affording communication from the conduit to the gage and terminating in a lip facing said packing, and a check valve in such passage normally closing such communication, and having a stem adapted for engagement by said valve unseating means, the said connection adapted to permit bodily movement of the gage so that in one position its unseating means is inoperative while in its other position such means unseats said valve and admits pressure from the conduit to the gage, and the gage packing is engaged with said lip to prevent escape of such pressure.

5. The combination with an air conduit for inflating a tire of a pressure gage and an intervening connection, the latter having a passage affording communication from the conduit to the gage, and a check valve independent of the gage and normally closing such passage, the gage movable bodily within the connection and having means for opening such check valve, and a spring within the connection for opposing such movement and holding the gage in its normal position with the check valve closed.

6. The combination with an air conduit for inflating a tire of a pressure gage, a packing and a deflating means at the foot and having an external flange at its foot and a connection having a passage communicating between the gage and conduit terminating in a lip for engagement with said packing, a check valve normally closing such passage, such connection having an internal flange coacting with said external flange to limit the movement of the gage, and a spring within the connection normally holding the gage elevated with said flanges in abutment.

7. The combination with an air conduit for inflating a tire of a connection containing a branch passage from said conduit, a check valve normally closing such passage, which connection comprises an inner tubular lip and an outer tubular member having an internal flange, and a pressure gage having its foot inclosed within said member of the connection, such foot having an external flange, and a spring within said member for normally holding said gage elevated.

In witness whereof, I have hereunto signed my name.

HENRY P. KRAFT.